United States Patent
Barraclough et al.

(10) Patent No.: US 7,339,604 B1
(45) Date of Patent: Mar. 4, 2008

(54) VIDEOCONFERENCING ARRANGEMENT HAVING MULTI-PURPOSE DIGITAL STILL CAMERA

(75) Inventors: Keith Barraclough, Menlo Park, CA (US); Bryan R. Martin, Campbell, CA (US); Kevin Deierling, Los Altos Hills, CA (US)

(73) Assignee: 8x8, Inc., Santa Clara, CA (US)

( * ) Notice: Subject to any disclaimer, the term of this patent is extended or adjusted under 35 U.S.C. 154(b) by 1826 days.

(21) Appl. No.: 08/941,975

(22) Filed: Oct. 1, 1997

Related U.S. Application Data

(63) Continuation-in-part of application No. 09/098,106, filed on Jun. 16, 1998, which is a continuation of application No. 09/005,053, filed on Jan. 9, 1998, which is a continuation-in-part of application No. 08/908,826, filed on Aug. 8, 1997, now Pat. No. 5,790,712, which is a continuation of application No. 08/658,917, filed on May 31, 1996, now abandoned, which is a continuation of application No. 08/303,973, filed on Sep. 9, 1994, now abandoned, which is a continuation of application No. 07/838,382, filed on Feb. 19, 1992, now Pat. No. 5,379,351.

(51) Int. Cl.
*H04N 7/14* (2006.01)
(52) U.S. Cl. .................. 348/14.01; 348/14.04; 348/14.05
(58) Field of Classification Search .......... 348/14, 348/15, 10, 211, 333, 552
See application file for complete search history.

(56) References Cited

U.S. PATENT DOCUMENTS

| | | | |
|---|---|---|---|
| 5,016,107 A | * | 5/1991 | Sasson et al. ............. 359/209 |
| 5,136,628 A | | 8/1992 | Araki et al. |
| 5,341,167 A | * | 8/1994 | Guichard et al. ............. 348/14 |
| 5,379,351 A | | 1/1995 | Fandrianto et al. |
| 5,568,185 A | | 10/1996 | Yoshikazu |
| 5,594,813 A | | 1/1997 | Fandrianto et al. |
| 5,619,285 A | | 4/1997 | Kobayashi |

FOREIGN PATENT DOCUMENTS

| | | | |
|---|---|---|---|
| JP | 403229588 A | * | 10/1991 |
| JP | 9-149333 | * | 6/1997 |

OTHER PUBLICATIONS

U.S. Appl. No. 08/656,917, filed May 31, 1996.
U.S. Appl. No. 08/682,990, filed Aug. 6, 1996.
U.S. Appl. No. 08/815,966, filed Mar. 13, 1997, Vools et al.
U.S. Appl. No. 08/861,019, filed May 22, 1997, Vools et al.
U.S. Appl. No. 08/934,184, filed Sep. 19, 1997, Martin et al.
ITU-T G.711 Standard, no date.
ITU-T G.723 Standard, no date.
ITU-T G.728 Standard, no date.
Product Review: A Poor, "Connectix VideoPhone: Conferencing on the Cheap", *PC Magazine*, Jan. 9, 1996 (2 pages).
Information sheet: "Connectix VideoPhone" (1 page), no date available.
Product Review: J. Polito, "Connectic Color QuickCam,", © 1996 Ziff-Davis Publishing Company (2 pages).
Advertisement: "Happy Computer Best picture quality . . . Great for vodeoconferencing or taking snaps includes Microsoft's NetMeeting 2.01", © 1997 MicroPal Corporation (1 page).

* cited by examiner

*Primary Examiner*—Melur Ramakrishnaiah
(74) *Attorney, Agent, or Firm*—Crawford Maunu PLLC

(57) ABSTRACT

A videoconferencing system uses a modular terminal that includes a conventional digital still camera coupled to the input port of the videocommunicator, such as a set top box. There are various features provided by this arrangement, including using the digital still camera to present video information to the videocommunicator with a split screen image representing the still image, a receiver arrangement permitting the digital still camera to fit securely and adjacent to the videocommunicator, and pan/tilt/zoom camera features provided electronically.

1 Claim, 2 Drawing Sheets

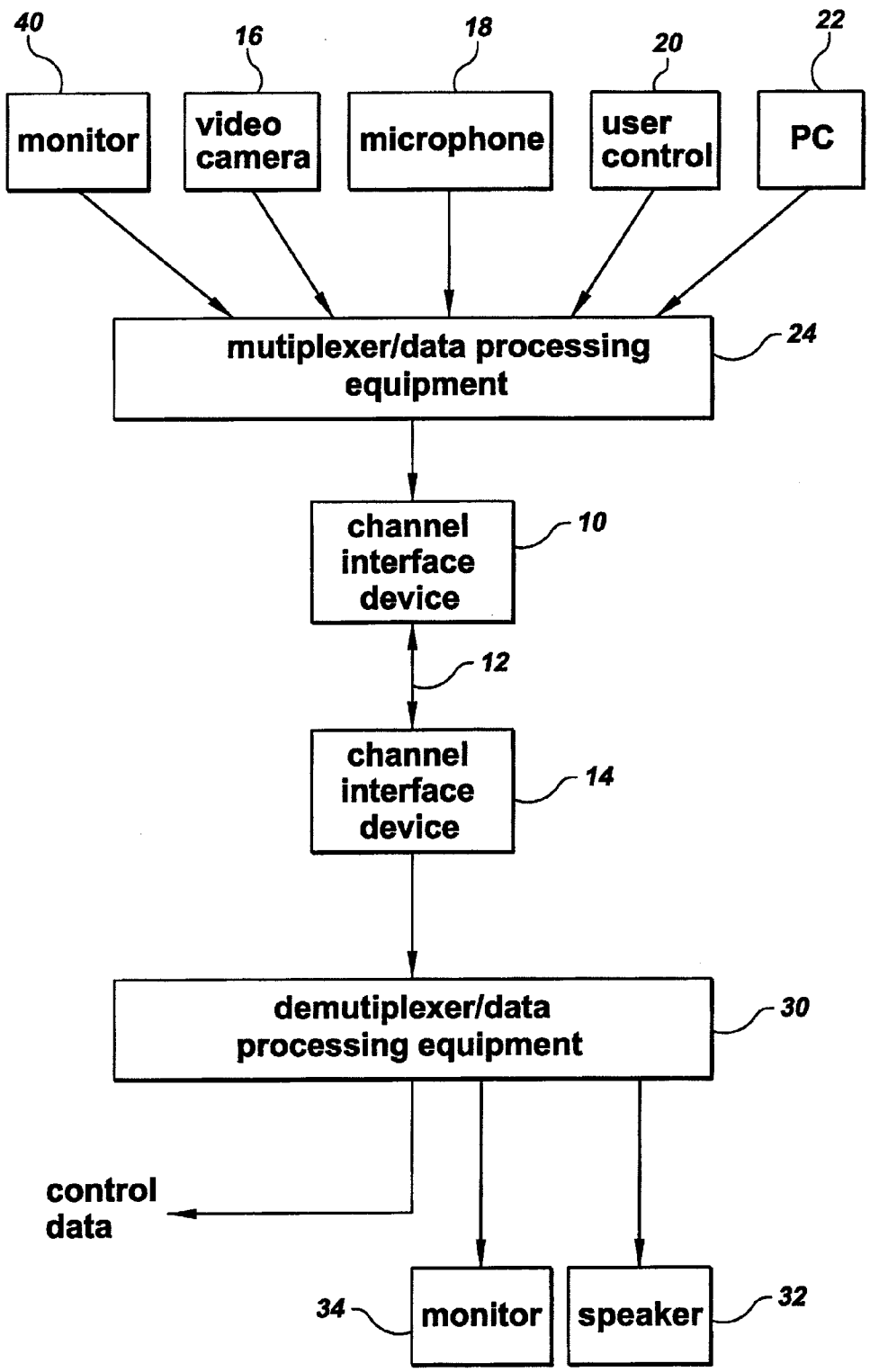

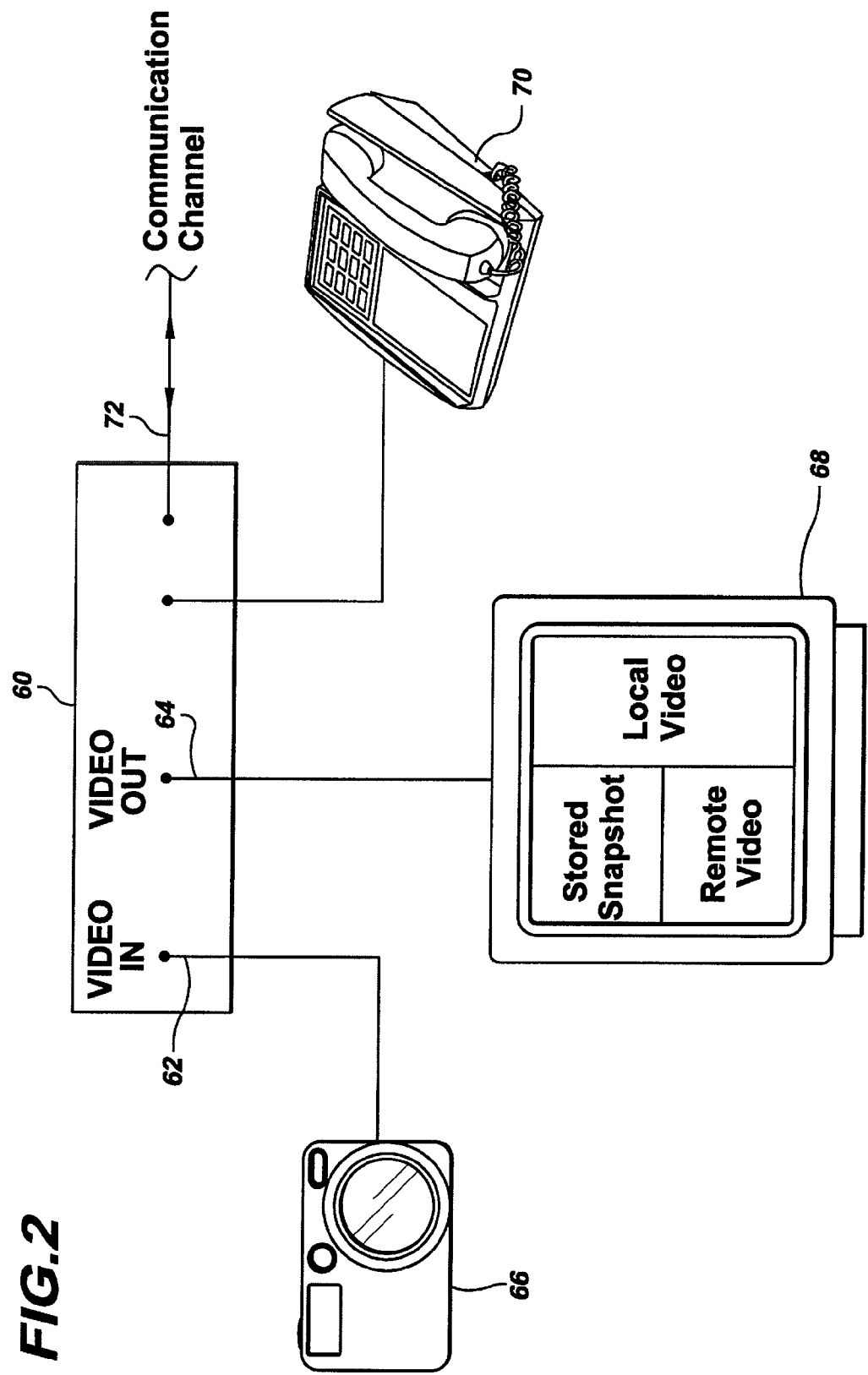

VIDEOCONFERENCING ARRANGEMENT HAVING MULTI-PURPOSE DIGITAL STILL CAMERA

RELATED APPLICATION

The instant application is related to, and fully incorporates the teachings of U.S. patent application Ser. No. 08/934,184, filed on Sep. 19, 1997, now U.S. Pat. No. 5,978,014 and entitled "Video TTY Device And Method For Videoconferencing."

The instant application also relates to and is a continuation-in-part of U.S. patent application Ser. No. 09/098,106, having an effectice priority date of Feb. 19, 1992, which is a continuation of U.S. patent application Ser. No. 09/005,053, filed on Jan. 9, 1998, which is a continuation-in-part of U.S. patent application Ser. No. 08/908,826, filed on Aug. 8, 1997 (now U.S. Pat. No. 5,790,712), which is a continuation of U.S. patent application Ser. No. 08/658,917, filed on May 31, 1996 (now abandoned), which is a continuation of U.S. patent application Ser. No. 08/303,973, filed Sep. 9, 1994 (now abandoned), which is a continuation of U.S. patent application Ser. No. 07/838,382, filed Feb. 19, 1992, now U.S. Pat. No. 5,379,351, priority to which is claimed under 35 U.S.C. § 120..

FIELD OF THE INVENTION

The present invention relates generally to communication systems and, more particularly, to video communication systems and arrangements.

BACKGROUND OF THE INVENTION

Video communication systems have become increasingly popular. Videoconferencing, for example, is becoming more common in both business and residential applications. Videoconferencing permits audio as well as visual live communication between two remotely located terminals communicating over a single channel. Videoconferencing has had limited success due to, for example, unavailability of a common network interface, overly complex controls, poor video quality, limited functionality, inconvenience, and high cost. Improving video quality and functionality while simultaneously decreasing costs has proven to be a seemingly unobtainable goal. For this reason, there have been opposing pressures to develop certain more expensive systems having increased video quality and functionality and certain other systems that forego the convenience and quality criteria for the sake of reducing costs.

One recent approach, that attempts to addresses some of the above-mentioned issues, uses a digital video camera coupled to the input port of a PC which is programmed to provide videoconferencing over a communications channel, such as the Internet. This approach is useful for applications where a PC is readily available and the user is fully familiar with downloading the software and using the PC to control the videoconferencing. However, the approach is disadvantageous for environments directed to those who are not as computer literate or not interested in using a computer for videoconferencing.

The above types of implementations are, of course, a compromise. Ideally, videoconferencing systems and equipment can be provided for both business and residential applications at reasonable costs and without sacrificing video quality, functionality, or convenience. The present invention is directed to accommodating this ideal.

SUMMARY OF THE INVENTION

The present invention is directed to methods and arrangements for use in videoconferencing. According to one embodiment, the present invention is directed to a method of videoconferencing comprising the steps of: providing a videocommunicator having a video signal input port, a video signal encoding circuit and a video signal output port; and using a digital still camera to generate video input signals to the video input port of the videocommunicator, the video output port of the videocommunicator capable of communicatively coupling to a communications channel for providing videoconferencing.

According to another embodiment of the present invention, an arrangement for a videoconferencing system includes means for coding and decoding video images; and a digital still camera having an output port providing digital information representing a target area to the coding and decoding means.

Another aspect of the present invention is directed to a system having two videoconferencing terminals. Each terminal includes a set-top box having a video input port and a video output port, and first and second telephone ports. The set-top box is configured and arranged to provide video signals over the video output port and to output local video data signals over the second telephone port. The set-top box further inputs remote video data signals using the second telephone port and is responsive to control signals provided at the first telephone port. A camera is coupled to the first video input port and is configured and arranged to output video signals representative of stored images of scenes captured by the camera. A telephone is coupled to the first telephone port and is used to receive control inputs and in response thereto, to provide control signals to the set-top box. A monitor is coupled to the video output port to receive the video signals and display images represented by the video signals.

The above summary of the invention is not intended to describe each disclosed embodiment of the present invention. An overview of other example aspects and implementations will be recognizable from the figures and from the detailed description that follows.

BRIEF DESCRIPTION OF THE DRAWINGS

Other aspects and advantages of the present invention will become apparent upon reading the following detailed description and upon reference to the drawings in which:

FIG. 1 is a block diagram of a videoconferencing system, according to a particular application of the present invention; and FIG. 2 is a block diagram of a modular videoconferencing arrangement, illustrating an example implementation of one terminal shown in the system of FIG. 1, according to another particular application of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is cover all modifications, equivalents and alternatives falling within the spirit and scope of the invention as defined by the appended claims.

DETAILED DESCRIPTION OF THE PREFERRED EMBODIMENT

While the present invention may be useful in a variety of applications, the present invention has been found to be particularly advantageous in videoconferencing applications requiring or benefiting from real time and/or still frame visual communications. One aspect of the present invention is directed to modular, low-cost videoconferencing providing real time visual communication along with still frame, picture-like functionality. An appreciation of various aspects of the invention is best gained through a discussion of various application examples operating in such an environment.

Turning now to the drawings, FIG. 1 illustrates a data processing system for a videoconferencing application. The system includes data sending equipment depicted above a communication channel 12 of FIG. 1 and data receiving equipment depicted below the communication channel 12. While the sending and receiving of such data is often reciprocal in many data processing applications of this type as with the instant videoconferencing illustration, the configuration illustrated in FIG. 1 is simplified in this regard to facilitate the discussion.

At the sending end of the system of FIG. 1, a transmitting channel interface device 10 is used to send processed data over the communication channel 12 to a receiving channel interface device 14. The data that is presented to the channel interface device 10 is collected from various types of data sources including, for example, a digital still frame video camera 16, a microphone 18, a user control device 20, and a conventional personal computer 22. The data sources typically use buffers to store the data to be collected. The data collected from each of these data sources is received by multiplexer/data processing equipment (MDPE) 24. The MDPE 24 collects and formats the data collected from each of the input sources for transmission over the channel 12. A monitor 40 is optionally used with the digital still frame video camera 16 to monitor the manner in which the video camera 16 captures the video images.

At the lower end of the system of FIG. 1, the formatted data communicated over the channel 12 is received by the channel interface device 14, which then presents the received data to demultiplexer/data processing equipment (DDPE) 30. The DDPE 30 is set up to sort out the formatted data received over the channel 12 according to instructions previously sent by the MDPE 24. The demultiplexed data is then presented to the appropriate output source equipment, including audio data to a speaker 32, video data to a monitor 34, and control data to external equipment for subsequent processing.

The MDPE 24 formats the collected data for transmission using any of a variety of modes of operation or capabilities. For example, audio data may be formatted using a capability that supports the ITU-T G.711, G.723, or G.728 standard.

For further information regarding use of a multiplexer to increase use of the transmission channel for video data, reference may be made to U.S. patent application Ser. No. 08/815,966, filed on Mar. 13, 1997, and now U.S. Pat. No. 6,026,097, which is incorporated herein by reference.

FIG. 2 illustrates a videocommunicator 60 including a digital signal processor for processing digital video data presented at a video input port 62 and for presenting encoded video data to an output port 64. The encoding provided by the videocommunicator 60 includes video data compression and, as the application may require, video data decompression functionality. The arrangement further includes a digital still camera 66, a monitor 68, such as a conventional television set, and a conventional touch-tone telephone 70. The digital still camera 66, as exemplified in FIG. 2, is a commercially available digital still frame camera which is useful and applicable for digital photography. The digital video signal provided from the digital still frame camera 66 to the video input port 62 is used by the videocommunicator 60 to present an image or selected images to the local monitor 68, as well as over a communications channel 72 for processing or display remotely.

Touch-tone telephone 70, as shown in the example embodiment of FIG. 2, is a conventional telephone that is used in this arrangement for conventional telephony applications, as well as to provide an audio interface for videoconferencing using the arrangement of FIG. 2. In addition, the keypad of the telephone 70 is used to provide user control for the videocommunicator 60 including, for example, electronic pan/tilt/zoom function control, split-screen control and image size control to the remote and local displays. For further information concerning an example method for implementing pan/tilt/zoom function control, reference may be made to U.S. patent application Ser. No. 08/861,619, entitled "Arrangement for Controlling the View Area of a Video Conferencing Device and Method Therefor" (incorporated herein by reference). Other control features and functions may be implemented using conventional keypad control operations and will not be further discussed in detail.

Another important aspect of the present invention is directed to the split-screen display capability provided by the arrangement of FIG. 2. Certain commercially available digital still frame cameras, for example, the Sony DSC-1 or DSC-F1, provide a digital video signal that, in response to snapping a photograph using the camera 66, produces a split-screen representation having a live image representation as well as a still image shown as a subset image of the overall image provided from the camera 66 to the video input port 62. Using the videocommunicator 60, the data information received at the video input port 62 is encoded and presented to the local or remote display as a split-screen picture with no data processing provided by the videocommunicator 60 and directed to split-screen functionality per se. However, using the keypad controls of the telephone 70, the target images respectfully captured by the remote terminal and the videoconferencing terminal depicted by the arrangement of FIG. 2 can be manipulated for one or both of the displays, along with the still image presented from the digital still frame camera 66. Accordingly, as shown in FIG. 2, in response to a user directing the videocommunicator 60 via the keypad controls, the monitor 68 displays the stored snapshot along with the local target image, as provided by the digital still frame camera 66, as well as the remote video image as presented over the communication channel 72. This permits the viewer of the monitor 68 to view the image that the user at the remote terminal is viewing (the remote video), the target image being provided by the local terminal (that includes the camera 66) and the subject item of discussion as displayed in still image form.

Specific applications for this above-described embodiment are seemingly without end. Using commercially available and relatively inexpensive components, such as the camera 66, a television set and a telephone, the videocommunicator can be used as a central controller providing videoconferencing signal coordination and processing in a relatively inexpensive, modular form.

It will be understood that the processor-based circuit, or videocommunicator shown above in FIG. 1 can be implemented using any of a variety of processor arrangements, including the arrangement of the referenced patent applications and that disclosed in U.S. patent application Ser. Nos. 08/692,993 (now U.S. Pat. No. 5,901,248) and 08/658,917, respectively entitled and relating to issued patents also entitled "Programmable Architecture and Methods for Motion Estimation" (U.S. Pat. No. 5,594,813) and "Video Compression and Decompression Processing and Processors" (U.S. Pat. No. 5,379,351). These applications and issued patents are, incorporated herein by reference. As other example implementations, the videocommunicator of FIG. 1 is configured as a ViaTV product available from 8×8, Inc. (modified if needed to connect directly to an external digital still frame camera) and as a set-top box with the features of a VC55-type ViaTV Phone arrangement and with a keypad control console, such as a keypad, coupled into the MDPE 24 using conventional wiring or an infrared transmitter/receiver arrangement. The features of the VC55 are described in the attached appendix, which is incorporated herein by reference.

The various embodiments described above are provided by way of illustration only and are not intended to limit the invention. Those skilled in the art will readily recognize various modifications and changes that may be made to the present invention without strictly following the example embodiments and applications illustrated and described herein. The scope of the present invention is set forth in the following claims.

We claim:

1. A method of videoconferencing comprising the steps of:

providing a videocommunicator having a video signal input port, a video signal output port, and a video signal encoding circuit with a programmable DSP circuit adapted to compress video data and with a programmable general purpose processor circuit;

using a digital still camera to generate video input signals to the video input port of the videocommunicator, the video output port of the videocommunicator capable of communicatively coupling to a communications channel for providing videoconferencing; and using the videocommunicator for controllably altering a display, including at least one of pan, tilt and zoom functions, of the video input signals without controlling the digital still camera.

* * * * *